(12) United States Patent
Sugimori

(10) Patent No.: US 9,083,890 B2
(45) Date of Patent: Jul. 14, 2015

(54) IMAGE CAPTURING APPARATUS, IMAGE PROCESSING APPARATUS AND IMAGE PROCESSING METHOD

(75) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/087,521

(22) Filed: Apr. 15, 2011

(65) Prior Publication Data

US 2011/0193992 A1    Aug. 11, 2011

Related U.S. Application Data

(62) Division of application No. 11/500,430, filed on Aug. 8, 2006, now abandoned.

(30) Foreign Application Priority Data

Aug. 17, 2005  (JP) .................................. 2005-236734

(51) Int. Cl.
| | |
|---|---|
| H04N 5/262 | (2006.01) |
| H04N 1/64 | (2006.01) |
| H04N 19/172 | (2014.01) |
| H04N 19/30 | (2014.01) |
| H04N 19/60 | (2014.01) |
| H04N 19/12 | (2014.01) |
| H04N 19/136 | (2014.01) |

(52) U.S. Cl.
CPC ............... *H04N 5/262* (2013.01); *H04N 1/646* (2013.01); *H04N 19/12* (2014.11); *H04N 19/136* (2014.11); *H04N 19/172* (2014.11); *H04N 19/30* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 5,073,818 A | 12/1991 | Iida | |
| 5,757,974 A | 5/1998 | Impagliazzo et al. | |
| 5,956,467 A | 9/1999 | Rabbani et al. | |
| 5,987,167 A * | 11/1999 | Inoue | 382/167 |
| 6,215,561 B1 | 4/2001 | Kakutani | |
| 8,334,910 B2 * | 12/2012 | Sugimori | 348/223.1 |
| 2002/0021360 A1 * | 2/2002 | Takemoto | 348/222 |
| 2002/0027603 A1 | 3/2002 | Kuwata et al. | |

(Continued)

FOREIGN PATENT DOCUMENTS

| | | |
|---|---|---|
| JP | 11-205620 A | 7/1999 |
| JP | 2000-230862 A | 8/2000 |
| JP | 2002-010095 A | 1/2002 |

OTHER PUBLICATIONS

Jun. 21, 2010 Japanese Official Action in Japanese Patent Appln. No. 2005-236734.

*Primary Examiner* — Michael Osinski
(74) *Attorney, Agent, or Firm* — Fitzpatrick, Cella, Harper & Scinto

(57) ABSTRACT

A digital camera which performs digital processing on an image obtained by image capturing has a three-dimensional lattice point data table for image data conversion processing. The digital camera holds a matrix coefficient set for performing the conversion processing by matrix operation. In the respective lattice points of the three-dimensional lattice point data table, values corresponding to the conversion processing with the matrix coefficient set are set. Then a raw image file, including compressed image data obtained by lossy compression on the image data converted by the conversion processing and the held matrix coefficient set, as attendant information, is generated.

14 Claims, 12 Drawing Sheets

(56) References Cited

U.S. PATENT DOCUMENTS

| | | | |
|---|---|---|---|
| 2002/0044293 A1 | 4/2002 | Fukasawa | |
| 2003/0034986 A1 | 2/2003 | Fukasawa | |
| 2003/0151667 A1* | 8/2003 | Nakami et al. | 348/207.1 |
| 2003/0156194 A1 | 8/2003 | Sugiura et al. | |
| 2004/0012691 A1* | 1/2004 | Takahashi | 348/222.1 |
| 2004/0017595 A1* | 1/2004 | Ikeda | 358/518 |
| 2004/0036898 A1* | 2/2004 | Takahashi | 358/1.9 |
| 2004/0090537 A1 | 5/2004 | Kubo | |
| 2004/0141192 A1 | 7/2004 | Jodra et al. | |
| 2005/0046883 A1 | 3/2005 | Chiba | |
| 2005/0063585 A1* | 3/2005 | Matsuura | 382/162 |
| 2005/0128316 A1* | 6/2005 | Sugimori | 348/223.1 |
| 2005/0280716 A1* | 12/2005 | Toyoda | 348/222.1 |
| 2006/0087665 A1* | 4/2006 | Wang | 358/1.9 |
| 2007/0195350 A1 | 8/2007 | Hattori | |
| 2008/0007564 A1* | 1/2008 | Tokunaga | 345/594 |
| 2008/0211924 A1* | 9/2008 | Sugimori | 348/222.1 |
| 2010/0111489 A1* | 5/2010 | Presler | 386/52 |

* cited by examiner

IMAGE CAPTURING APPARATUS, IMAGE PROCESSING APPARATUS AND IMAGE PROCESSING METHOD

This application is a division of application Ser. No. 11/500,430 filed Aug. 8, 2006.

BACKGROUND OF THE INVENTION

1. Field of the Invention

The present invention relates to image processing in an image capturing apparatus such as a digital camera.

2. Description of the Related Art

Generally, regarding image processing within digital cameras, in performing various conversion processing (for example, a gamma conversion) in, 3×3 matrix operation, a one-dimensional look-up table and the like are used. These conversion processings are appropriate for reducing the amount of hardware memory and gates in chip downsizing, and in scale reduction for energy saving. However; in recent years, advancement in hardware microminiaturization and reductions in IC power source voltage have allowed, chip size reductions and more effective energy savings to be realized. As a result, it is now possible to mount a complex circuit, a large capacity memory and the like within the IC. Accordingly, it is now becoming possible to perform complex image processing within digital cameras using a three-dimensional look-up table (hereinbelow, referred to as a "three-dimensional lattice point data table"), high-order matrix operation or the like.

However, in many cases, since the number of lattice points and bits are constrained by the hardware within the IC, high-precision image processing as in the case of application software cannot be performed. Further, when development processing (processing to develop a captured image) is performed on raw image data by an application, it is necessary to record data on the look-up table in an image file obtained by image capturing. In this arrangement, the file size of the raw image increases. For example, in an m-grid three-dimensional lattice point data table, because the number of grids in one dimension is m, the total number of grids is $m^3$. Accordingly, the m-grid three-dimensional data table (three-dimensional look-up table), where three n-byte values are allotted to the respective grids, requires a capacity of $m^3 \times n \times 3$ bytes. More concretely, in a 9-grid 8-bit three-dimensional lattice point data table requires a capacity of 2187 ($=9 \times 9 \times 9 \times 1 \times 3$) bytes. In contrast to this, a 33-grid 16-bit three-dimensional lattice point data table requires a hundredfold capacity, 215622 ($=33 \times 33 \times 33 \times 2 \times 3$) bytes. Further, when there are multiple user-selectable three-dimensional look-up tables, for the subsequent development processing, it is desirable to record all the three-dimensional look-up tables in a file. In this case, file size is further increased, as well as the time required to save the file into a memory. As a result, the number of image frames that can be captured in a series is limited.

U.S. Pat. No. 5,073,818 discloses a printer having a look-up table circuit for image processing. According to this U.S. Pat. No. 5,073,818, because the file size increases when the entire look-up table is stored, a look-up table for actual image conversion is generated from correction functions.

However, if all the data is generated using a look-up table for image processing with high bit precision, the data size of the look-up table becomes enormous, and the circuit scale increases. Further, to perform image processing using high-order matrix operations for image processing with high bit precision, a large number of multipliers are required, and when the number of bits is increased, the gate scale increases markedly. In actually, even when up to two-dimensional matrix operations are used, the level of freedom in image processing is limited with respect to processing using a three-dimensional lattice point data table.

Further, when image processing is performed by an application with an algorithm different from that used in image processing within a camera, it is necessary to previously set coefficients for obtaining a similar processing result in the camera. In this case, a large amount of data of the three-dimensional lattice point data table, which is not used in image processing within the camera, must be stored in the ROM of the camera, and the efficiency of memory usage is seriously lowered.

SUMMARY OF THE INVENTION

The present invention has been made in view of the above problems, and provides an image capturing apparatus for image processing using a lattice point data table, in which a necessary memory capacity for storage of lattice point data table or the like is reduced.

According to one aspect of the present invention, there is provided an image capturing apparatus for performing digital processing on an image obtained by image capturing, comprising:

a conversion unit adapted to perform conversion processing on image data using a lattice point data table;

a holding unit adapted to hold a matrix coefficient set for performing the conversion processing by matrix operation; and a setting unit adapted to calculate values of respective lattice points of the lattice point data table using the matrix coefficient set, and set the values in the lattice point data table used by the conversion unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

Figure 1:
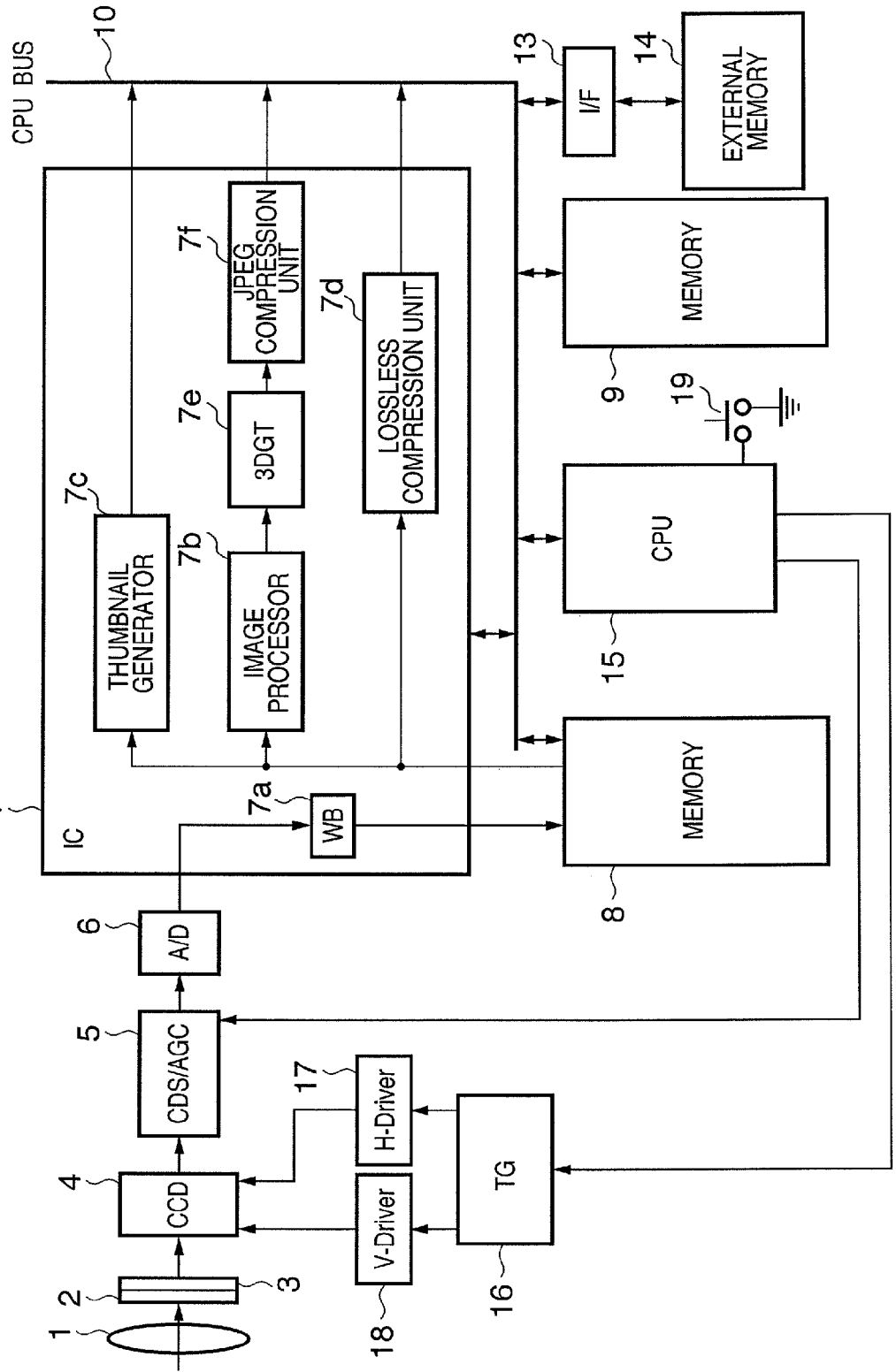
FIG. 1 is a block diagram showing the entire image capturing apparatus according to a first embodiment of the present invention.

FIG. 1 is a block diagram showing the construction of a digital camera according to a first embodiment of the present invention. In FIG. 1, light passed through an image capturing lens 1 is formed into an image on an image capture device 4 via an infrared cut-off filter 2 and an optical LPF 3. As the image capture device 4, a CCD sensor, a CMOS sensor or the like may be used. Generally, photodiode sensors are two-dimensionally arrayed on a photoreception surface of the image capture device 4. For example, one color is allocated to one sensor by a color filter where respective R (red), G (green) and B (blue) primary color filters are arrayed in a predetermined pattern. Otherwise, it may be arranged such that the image capture device 4 is prepared in correspondence with the number of primary colors, and one color is allocated to one image capture device.

In correspondence with depression of a shutter button 19, a CPU 15 performs the following image capturing operation. First, light image-formed on the image capture device 4 is converted by the respective sensors to electric charges corresponding to incident light quantities. A signal generated by a timing generator 16 is supplied to a horizontal driver 17 for horizontal driving and a vertical driver 18 for vertical driving. The horizontal driver 17 and the vertical driver 18 supply a driving signal to the image capture device 4 in accordance with the signal from the timing generator 16. In accordance with the driving signals, the electric charges accumulated in the sensors are transmitted from the image capture device 4 and sequentially converted to voltage signals.

The voltage signals are sampled and gain-controlled by a correlated double sampling/gain controller (hereinbelow, abbreviated to "CDS/AGC") 5, then converted to digital signals by an A/D converter 6. The image data converted to digital signals by the A/D converter 6 is inputted into an image processing IC 7. In the image processing IC 7, first, a WB circuit 7a calculates data for white balance for the input image data. The data for white balance and the image data are temporarily stored into the memory 8.

The image data stored in the memory 8 is inputted into the image processing IC 7 again, and subjected to the following three processings.

(1) The image data converted to the digital signals is subjected to lossless compression (reversible compression) by a lossless compression unit 7d, and sent as raw data to a CPU bus 10.

Figures 12A, 12B:
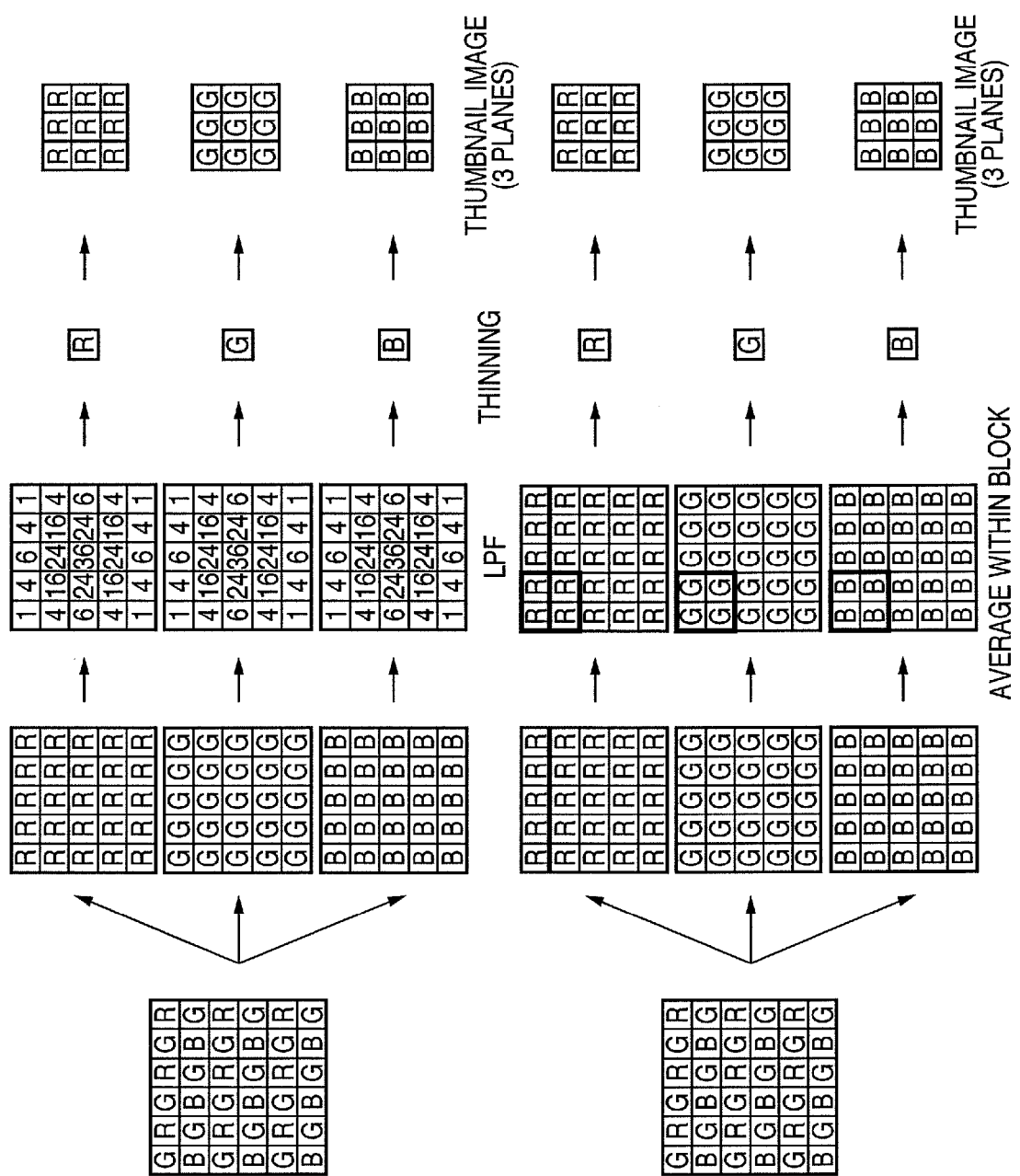
FIGS. 12A and 12B illustrate thumbnail image generation according to the first embodiment.

(2) The image data converted to the digital signals is changed to a thumbnail image having a size smaller than the original image size by down sampling such as thinning processing by the thumbnail generator 7c, and sent to the CPU bus 10. Note that in the thinning processing, as in the case of FIG. 12B, for example, the down sampling is performed by averaging the raw image data in block units.

(3) To generate an image for JPEG compression, first, image processing is performed by an image processor 7b (the details will be described later in FIG. 2). Then YCbCr color-space image data, outputted as a result of the processing, is inputted into a three-dimensional lattice point data table 7e. The image data converted by the three-dimensional lattice point data table 7e is raster-block converted by the JPEG compression unit 7f thereby JPEG compressed, and sent to the CPU bus 10.

Note that in the present embodiment, the three-dimensional lattice point data table is synonymous with a three-dimensional look-up table.

The lossless-compressed raw data and the JPEG-compressed image data are stored into a memory 9 via the CPU bus 10. The CPU 15 generates a raw image file having the raw data stored in the memory 9 accompanied by the JPEG compressed image. The JPEG compressed image is attached as preview data of the raw data. The generated raw image file is stored into an external memory 14 removably connected via an interface 13. In the above construction, the three-dimensional lattice point data table 7e is used for generation of a preview JPEG image generated at the same time of generation of the raw data and attached to the raw image file. In the present embodiment, as described later, three-dimensional lattice point data of the three-dimensional lattice point data table 7e is generated from high-order matrix coefficients. The matrix coefficients as a basis of the three-dimensional lattice point data table 7e are also attached to the raw image file.

Note that a control program to realize the above processing by the CPU 15 is stored in the memory 8 or the memory 9.

Next, the image processing performed by the image processor 7b will be described in more detail with reference to FIG. 2. FIG. 2 is a block diagram showing the details of the image processor 7b.

Figure 2:
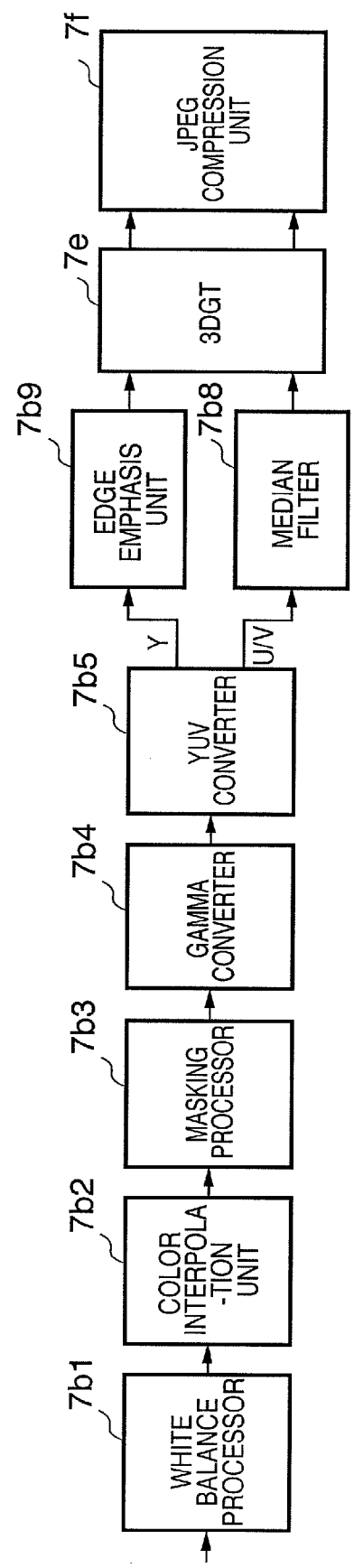
FIG. 2 is a block diagram showing the details of an image processor 7b in the image capturing apparatus in FIG. 1.
Figure 3:
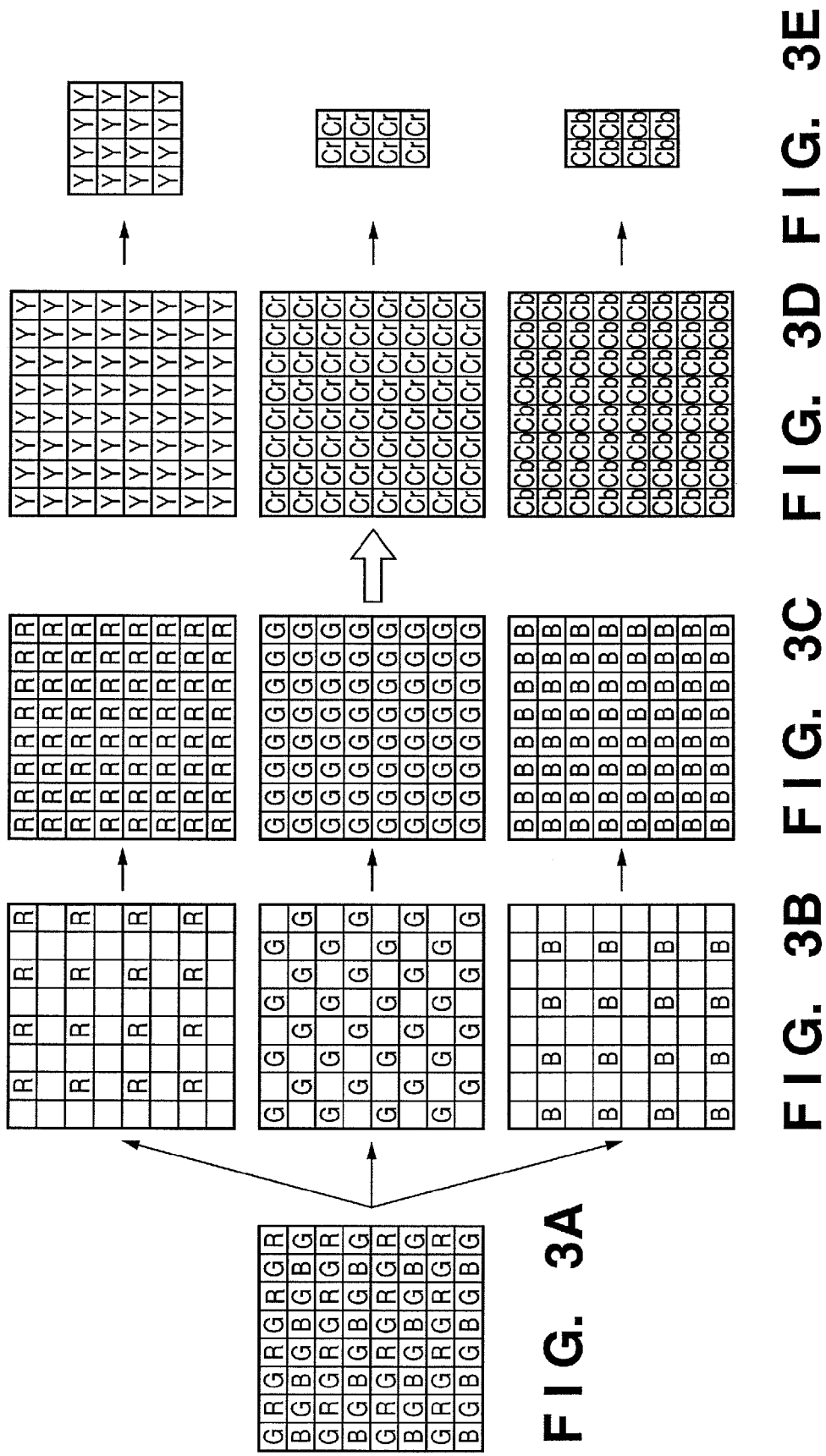
FIGS. 3A-3E illustrates color interpolation in image processing according to the first embodiment.

In FIG. 2, the image data inputted from the memory 8 is first supplied to the white balance processor 7b1. The white balance processor 7b1 performs white balance processing on the image data using a white balance coefficient. Note that the white balance coefficient is calculated by the CPU 15 based on the data for white balance calculated by the WB circuit 7a. The white balance coefficient is stored in the memory 8, and set in the register of the IC 7 in accordance with necessity. Otherwise, it may be arranged such that the white balance processing is performed on the input image data using a preset white balance coefficient (e.g., a white balance coefficient previously set in correspondence with a light source such as daylight, tungsten, fluorescent lamp or the like). The white-balance-processed image data is inputted into the color interpolation unit 7b2, and subjected to color interpolation processing. As shown in FIGS. 3A-3C, R, G and B planes (FIG. 3C) are generated from the data patterns (FIG. 3A) and (FIG. 3B) where RGB are arrayed in lattice.

Next, the RGB plane image data is subjected to color optimization by a masking processor 7b3 using, e.g., 3×3 matrix operation (expression (1)).

$$R' = m11 \times R + m12 \times G + m13 \times B$$

$$G' = m21 \times R + m22 \times G + m23 \times B$$

$$B' = m31 \times R + m32 \times G + m33 \times B \qquad (1)$$

The image data is supplied via the masking processor 7b3 to a gamma converter 7b4. The gamma converter 7b4 performs gamma conversion on the image data. A YUV converter 7b5 converts the RGB signal image data gamma-converted by the gamma converter 7b4 into YUV signals of luminance and color difference components, thereby generates Y, Cb and Cr planes (FIG. 3D). The conversion to the YUV signals is performed for false color processing and edge emphasis processing.

Upon generation of JPEG image, the luminance signal (Y) among the YUV signals is edge-emphasized by an edge emphasis circuit 7b9. Further, the color difference component signals (UV) among the YUV signals are subjected to noise processing by a median filter 7b8.

The edge-emphasized Y signal and the noise-processed UV signals are inputted into the three-dimensional lattice point data table 7e and color-converted. The YUV data outputted from the three-dimensional lattice point data table 7e is JPEG-compressed by the JPEG compression unit 7f.

Figure 4:
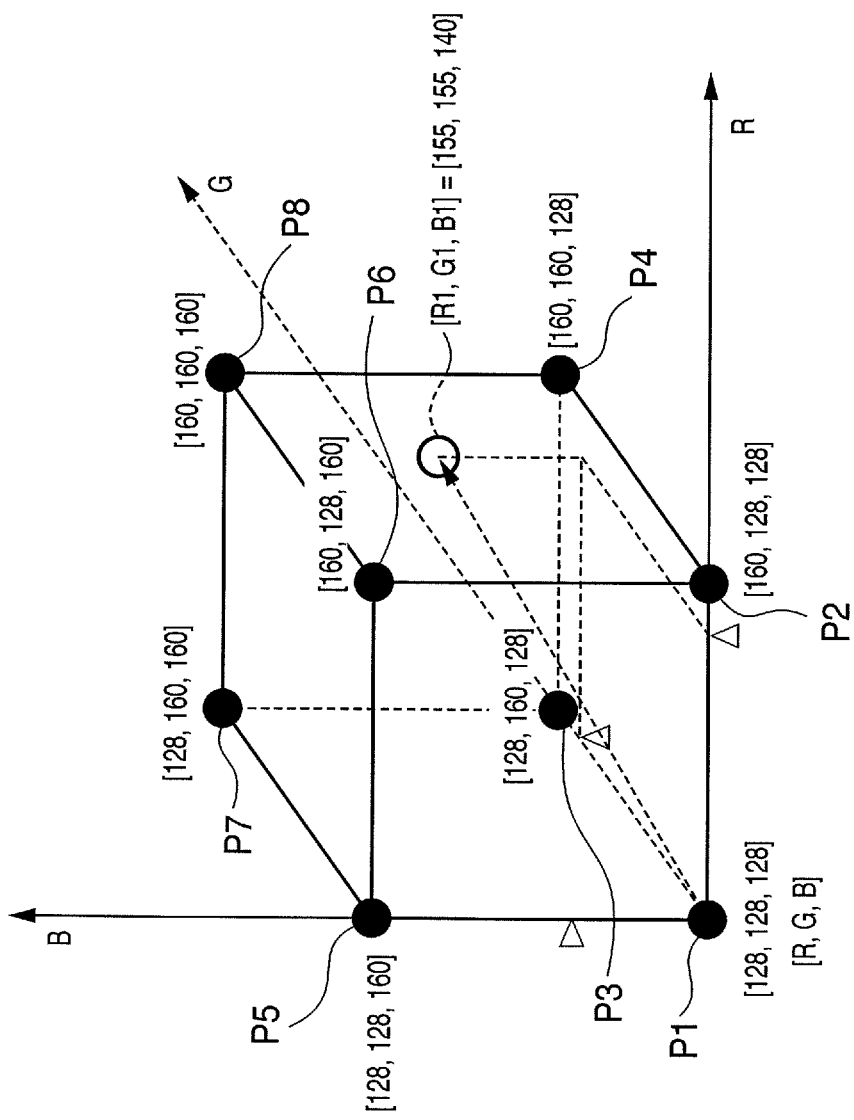
FIG. 4 illustrates a three-dimensional lattice point data table according to the first embodiment.

Next, the three-dimensional lattice point data table 7e will be described in detail. FIG. 4 illustrates a part of the three-dimensional lattice point data table. In this example, RGB signals are inputted, however, in FIGS. 1 and 2, YUV signals are inputted. The YUV signals may be converted to RGB signals within the three-dimensional lattice point data table 7e, otherwise, a YUV three-dimensional lattice point data table may be used.

When [R1, G1, B1]=[155, 155, 140] holds as the input data, the position in the three-dimensional lattice point data table having nine lattice points (9 grids) is as shown in FIG. 4, i.e., the data position is surrounded by eight lattice points. In this case, when simple linear interpolation is performed on the input data, the value of Red can be calculated using data interpolation between positions P1 and P2, data interpolation between positions P3 and P4, data interpolation between positions P5 and P6, and data interpolation between positions P7 and P8. Note that P1=[128, 128, 128] holds, P2=[160, 128, 128] holds, P3=[128, 160, 128] holds, and P4=[160, 160, 128] holds. Further, P5=[128, 128, 160] holds. P6=[160, 128, 160] holds, P7=[128, 160, 160] holds, and P8=[160, 160, 160] holds.

Assuming that the value of the [128, 128, 128] lattice point (P1) is [130, 120, 120] and that of the [160, 128, 128] lattice point (P2) is [165, 120, 120], the value in the position [155, 128, 128] is $$(165-130)+(160-128)\times(155-128)+130=159.5 \quad (2)$$

Similarly, interpolation is performed in other three positions (P3-P4, P5-P6, P7-P8), and the value of Red in the point [155, 155, 140] is determined. For example, weighting is performed using inverse proportion of distances between the respective line segments P1-P2, P3-P4, P5-P6 and P7-P8 and the point [155, 155, 140] and averaging is performed. These calculations are also performed regarding Green and Blue, thus, RGB values in the point [155, 155, 140] are determined.

As the above calculations are very simple, the circuit scale can be far smaller than that in the case of high-order matrix operation.

For example, in the case of matrix operation up to third order is:

$$\begin{aligned}Red = {} & m01\times R + m02\times G + m03\times B + \\ & m04\times R\times R + m05\times G\times G + m06\times B\times B + m07\times R\times G + \\ & m08\times R\times B + m09\times G\times B + m10\times R\times R\times G + \\ & m11\times R\times R\times B + m12\times R\times R\times R + m13\times R\times G\times G + \\ & m14\times G\times G\times B + m15\times G\times G\times G + m16\times R\times B\times B + \\ & m17\times G\times B\times B + m18\times B\times B\times B + m19\times R\times G\times B\end{aligned} \quad (3)$$

The calculation processing requires 19 coefficients, 45 multiplications and 18 additions. Further, similar calculations are performed for Green and Blue.

Although the above matrix operation can be realized with hardware, the circuit scale is inevitably increased. In the present embodiment, the three-dimensional lattice point data table is not directly stored, but a high-order matrix coefficient set as a basis of the three-dimensional lattice point data table is stored within the camera. Then the three-dimensional lattice point data table is generated using the high-order matrix coefficient set. For example, the above m01-m19 matrix coefficient set is stored, and prior to development processing, R, G and B values of the respective lattice points of the three-dimensional lattice point data table are substituted into the expression (3) and Red values in the respective lattice points are obtained. Similarly, Green and Blue values in the respective lattice points are obtained. In this manner, the three-dimensional lattice point data is generated, and the generated data is set in the three-dimensional lattice point data table 7e.

Figure 5:
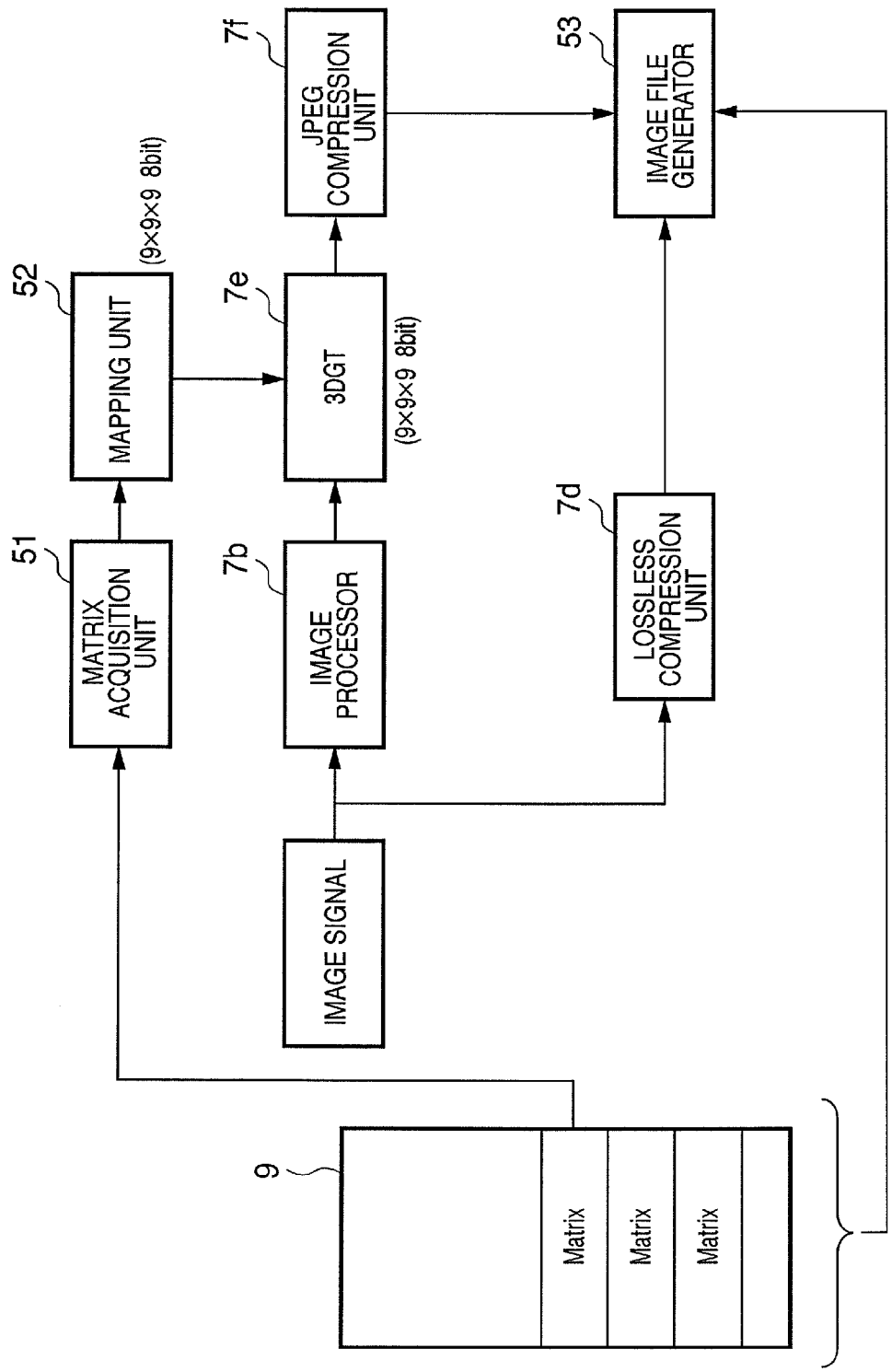
FIG. 5 is a block diagram showing a functional construction for raw image file generation according to the first embodiment.
Figure 6:
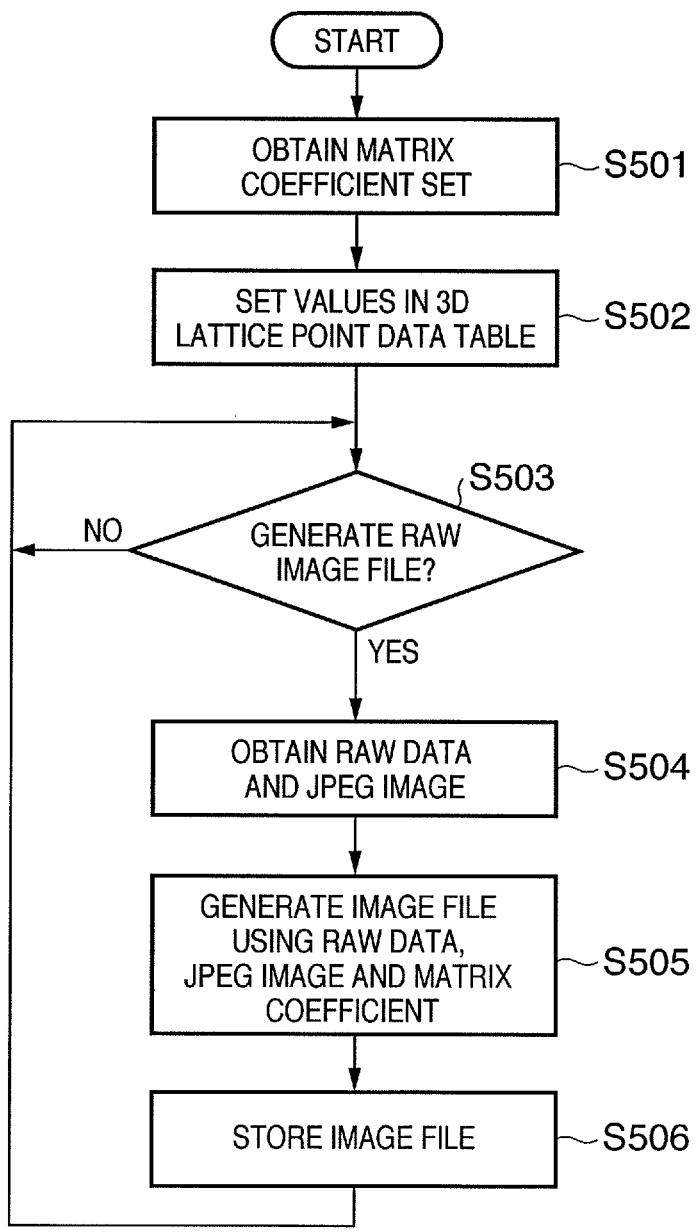
FIG. 6 is a flowchart showing raw image file generation processing according to the first embodiment.

FIG. 5 is a block diagram showing a functional construction for setting of the three-dimensional lattice point data table according to the first embodiment. FIG. 6 is a flowchart showing three-dimensional lattice point data table setting processing by the CPU 15. In FIG. 5, a matrix acquisition unit 51, a mapping unit 52 and an image file generation unit 53 are functions realized by executing the control program stored in the memory 8 or 9 by the CPU 15. At step S501, the matrix acquisition unit 51 obtains a matrix coefficient set. The matrix coefficient set is stored in, e.g., memory 9. Note that in FIG. 5, plural matrix coefficient sets are stored in the memory 9, and one appropriate matrix coefficient set is selected in accordance with an image-captured scene (a landscape scene, a portrait scene or the like) selected by a user. At step S502, the mapping unit 52 calculates the values in the respective lattice points of the three-dimensional lattice data table 7e using the matrix coefficient set obtained at step S501 and sets the values in the three-dimensional lattice point data table 7e. In the present embodiment, a 9-grid lattice point data table where the respective lattice point data include three 1-byte values is generated from a 3×19 matrix coefficient set.

When an image file is generated using raw data, obtained by lossless compression or the like directly on output from the CCD or CMOS sensor array, without execution of the main image processing such as white balance processing, the process proceeds from step S503 to step S504. At step S504, lossless-compressed raw image data and JPEG-compressed JPEG image data are generated by the image processing IC 7 and stored into the memory 9. The image file generator 53 obtains the lossless-compressed raw image data and the JPEG-compressed JPEG image data from the memory 9. At step S505, the image file generator 53 generates a raw image file using the lossless-compressed raw data, the JPEG image data and the matrix coefficient set obtained from the memory 9. The JPEG image data and the matrix coefficient set are recorded in the raw image file as attendant information. At step S506, the generated raw image file is stored in the external memory 14. Note that as shown in FIG. 5, when plural types of matrix coefficient sets are stored in the memory 9, at step S505, the image file generator 53 obtains all the matrix coefficient sets and records them as attendant information in the raw image file. Note that it may be arranged such that only the matrix coefficient set used in generation of the lattice point data of the three-dimensional lattice point data table 7e is recorded as attendant information in the raw image file.

Note that as the raw data, any data may be used as long as it is not subjected to at least main image processing such as white balance processing, color separation processing to separate data into luminance and color signals, or color interpolation processing on output signals from a Bayer array.

Further, the raw image file is not limited to the above raw image file structure as long as attendant information including raw data and matrix coefficient set and JPEG image data are mutually linked.

When a new raw image file is generated, the above steps S503 to S506 are repeated. Note that when the matrix coefficient set is changed due to change of image-captured scene or the like, the processing from step S501 is performed, and a three-dimensional lattice point data obtained by using a new matrix coefficient set is set in the three-dimensional lattice point data table.

As described above, according to the digital camera of the first embodiment, as a matrix coefficient set is described in place of a three-dimensional lattice data table in an image file, the data amount of the raw image file can be reduced.

The three-dimensional lattice point data table on the digital camera side has been described as above, however, the construction to generate a three-dimensional lattice point data table from the above-described matrix coefficients can be applied to an application which operates on an information processing apparatus.

Figure 7:
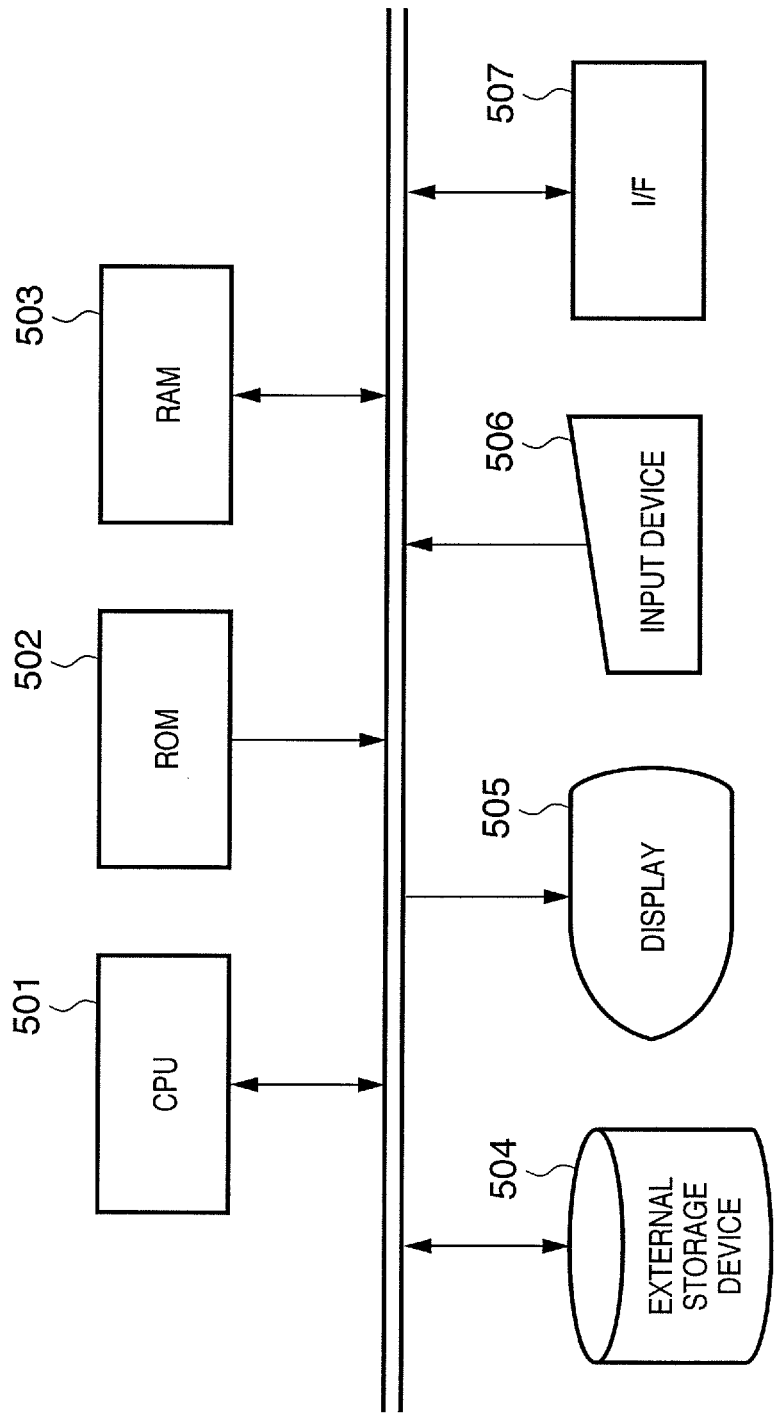
FIG. 7 is a block diagram showing the construction of an image processing apparatus according to the first embodiment.

FIG. 7 is a block diagram showing the construction of an image processing apparatus. As the information processing apparatus, a general personal computer may be used. In FIG. 7, a CPU 501 realizes respective processings by executing a program stored in a ROM 502 or RAM 503. The ROM 502 holds a basic input/output system, a boot program and the like in the information processing apparatus. The RAM 503 functions as a main memory of the CPU 501. A program installed in an external storage device 504, to be executed by the CPU 501, is loaded into the RAM 503. A display 505 performs various displays under the control of the CPU 501. An input device 506 has a keyboard, a pointing device and the like. An interface 507 is connectable with, e.g., the external memory 14 of the digital camera, for reading a raw image file recorded in the external memory 14 into the RAM 503 or the external storage device 504.

Various applications are installed into the external storage device 504, and loaded into the RAM 503 upon execution. Note that as the external storage device 504, a hard disk is generally used. Hereinbelow, an application to process a raw image file generated by the above-described digital camera will be described.

Figure 8:
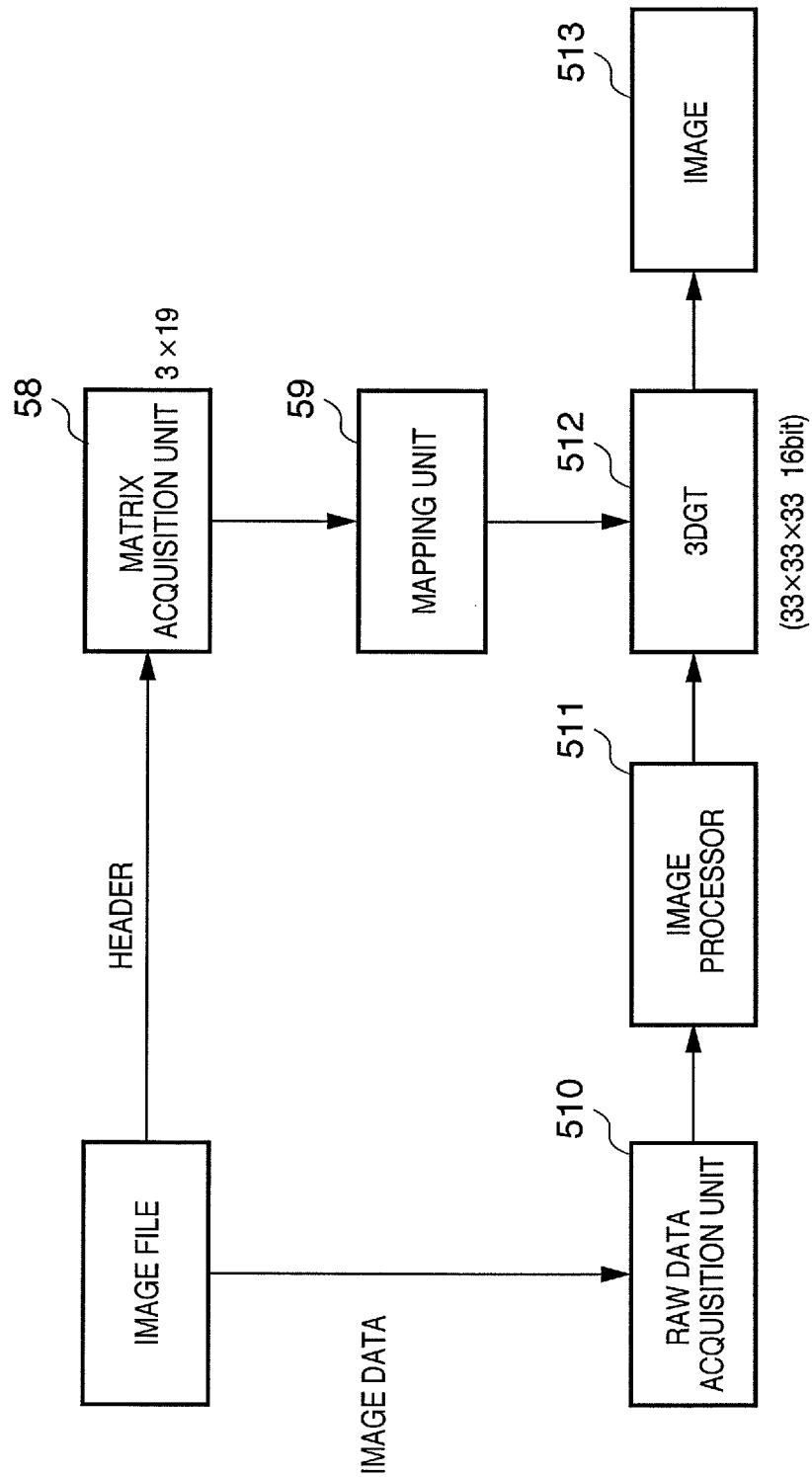
FIG. 8 is a block diagram showing a functional construction for raw data processing in the information processing apparatus according to the first embodiment.
Figure 9:
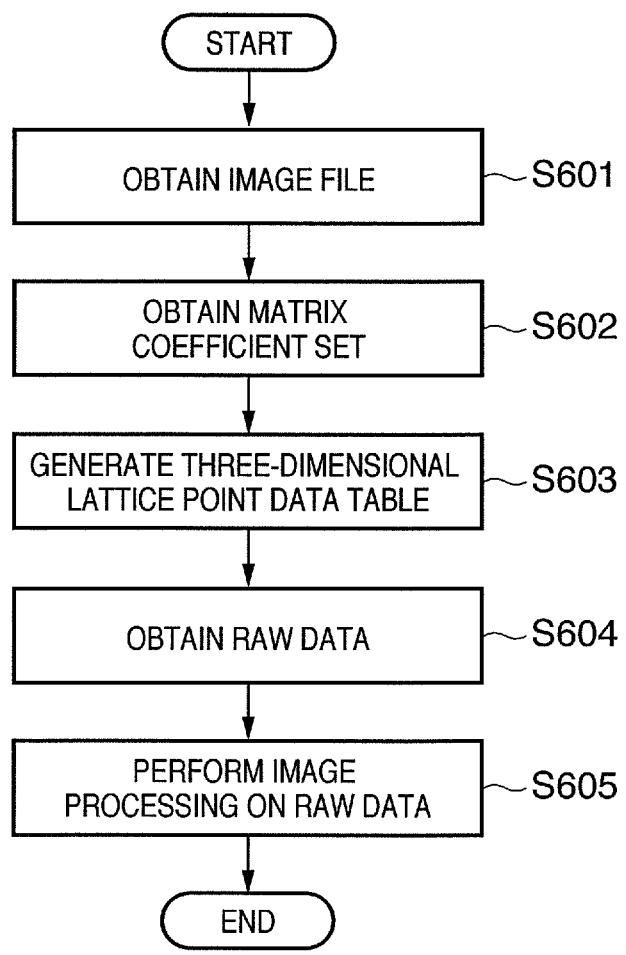
FIG. 9 is a flowchart showing raw image file processing in the information processing apparatus according to the first embodiment.

FIG. 8 is a block diagram showing a functional construction for image processing realized by the information processing apparatus. The respective units are functions realized by executing a control program loaded in the RAM 503 by the CPU 15. FIG. 9 is a flowchart showing image processing performed by the information processing apparatus (CPU 15). First, at step S601, a raw image file generated by the above-described image file generator 53 is obtained. Then at step S602, the matrix acquisition unit 58 obtains a matrix coefficient set from a header of the image file. As described above, when plural matrix coefficient sets are recorded, one of them is selected by the user. For example, the application causes the user to select an image-captured scene, and a matrix coefficient set is selected in accordance with the selected scene. At step S603, the mapping unit 59 calculates values corresponding to the respective lattice points of a three-dimensional lattice point data table 512 (three-dimensional lattice point data) using the matrix coefficient set obtained by the matrix acquisition unit 58. Then, the three-dimensional lattice point data is set in the three-dimensional lattice point data table 512. Note that the mapping unit 59 generates a 33-grid lattice point data table where the respective lattice point data include three 2-byte values from a 3×19 matrix coefficient set.

At step S604, the raw data acquisition unit 510 obtains raw data from the raw image file, and at step S605, image processing using the lattice point data table 512 is performed on the obtained raw data, and a processed image 513 is obtained. That is, step S605 corresponds to a processor using the image processor 511 and the three-dimensional lattice point data table 512.

Note that although not described in the above processing, a preview display of the image is produced using the JPEG image written in the raw image file (written in the header of the image file).

In the above application, conversion processing using the three-dimensional lattice point data table 512 can be realized by high-order matrix operation. However, it takes much time in such matrix operation. Accordingly, in the present embodiment, a three-dimensional lattice point data table is generated from a matrix coefficient set and processing time is reduced by using the generated three-dimensional lattice point data table. For example, in the case of 33-grid three-dimensional lattice point data table, calculation for 33×33×33=35937 points is performed for RGB, thereby a three-dimensional lattice point data table can be generated. In comparison with matrix operation for 10,000,000 pixel data, the calculation time in the processing of the present embodiment is $\frac{1}{300}$. Accordingly, even when conversion processing using the three-dimensional lattice point data table is performed thereafter, i.e., even when the generation of the three-dimensional lattice point data table and the conversion processing using the table are performed, the calculation time can be reduced.

Further, in a case where a raw image file is structured so as to have the three-dimensional lattice point data table 512 as above as data, when the data is stored in 16-bit precision, the data amount exceeds 210 Kbytes. Further, when such three-dimensional lattice point data is stored for plural sets in the memory in the camera and all the lattice point data are written as attendant information into a raw image file by image-sensing data, it is apparent that much time is required for image file writing.

Regarding the above construction, according to the present embodiment, the data amount of image file can be reduced and writing time can be reduced by storing a high-order matrix coefficient set (e.g., 3×19 matrix coefficients) as a basis of a three-dimensional lattice point data table. Further, a three-dimensional lattice point data table having grids corresponding to a necessary number of grids can be generated from the matrix coefficients. For example, a three-dimensional lattice point data table in the camera has nine points per one dimension, while the application can generate a three-dimensional lattice point data table having 33 points per one dimension from the same matrix coefficient set. Accordingly, high precision can be maintained in the application. There is a difference in precision between color representation inside the camera and that in the application, however, it is effective that priority is given to the color representation precision in the application, while priority is given to high-speed processing on amount-reduced data inside the camera.

Second Embodiment

Next, the image processing in the digital camera according to a second embodiment will be described with reference to FIG. 10.

The digital camera itself performs development processing and generates JPEG data, or the digital camera generates raw data. The raw data is obtained by performing lossless compression or the like on output from CCD or CMOS sensor array without execution of main image processing such as white balance processing. Such raw data is used in desirable imaging by image processing with an information processing apparatus outside the camera. The image processing on the raw data in the information processing apparatus may be the same as the image processing within the camera, however, image processing in the information processing apparatus may not especially be the same as the image processing within the camera. It may be arranged such that image processing which cannot be performed with hardware is realized on an application so as to provide a more excellent image. As an example, in the application software shown in the first embodiment, the number of lattice points of the three-dimensional lattice point data table is not necessary the same as that of the hardware of the camera.

However, in the application software, although the bit precision can be easily increased, the processing speed is obviously lower than that in the hardware.

In the application, image processing different from the image processing inside the camera can be realized by increasing the processing speed with another method and further handling inconvenience. On the other hand, when the image processing inside the camera and that in the application are different, if a common three-dimensional lattice point data or common high-order matrix data is used, the results of processing may be different. Accordingly, as shown in the memory 9 in FIG. 10, three-dimensional lattice point data for camera (9a) and a high-order matrix coefficient set (9b) as a basis of three-dimensional lattice point table data for the application, linked with each other, are stored inside the camera. The matrix coefficient sets are set such that the application can output the same image as a JPEG image outputted from the digital camera main body.

Figure 10:
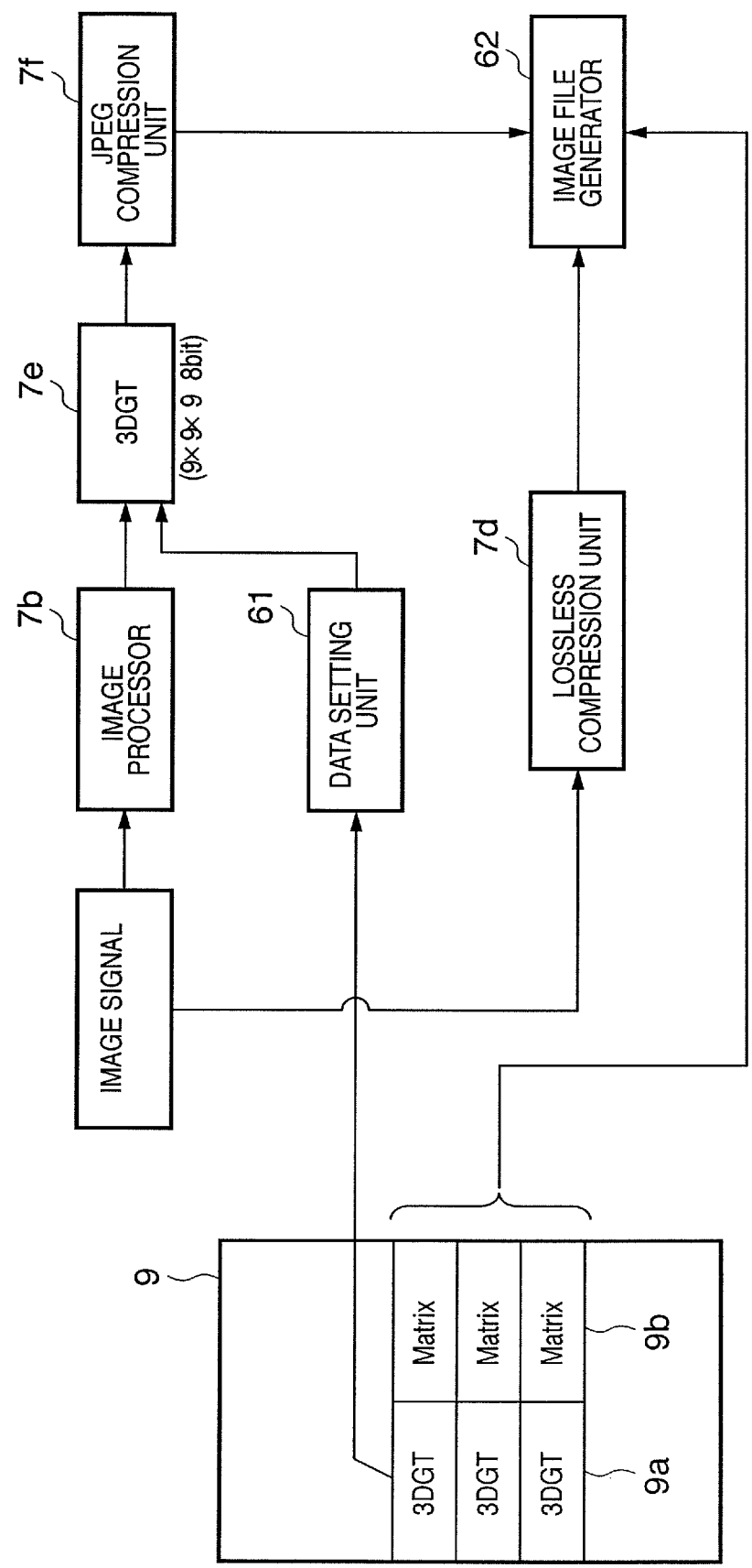
FIG. 10 is a block diagram showing the functional construction for the raw image file generation according to a second embodiment of the present invention.
Figure 11:
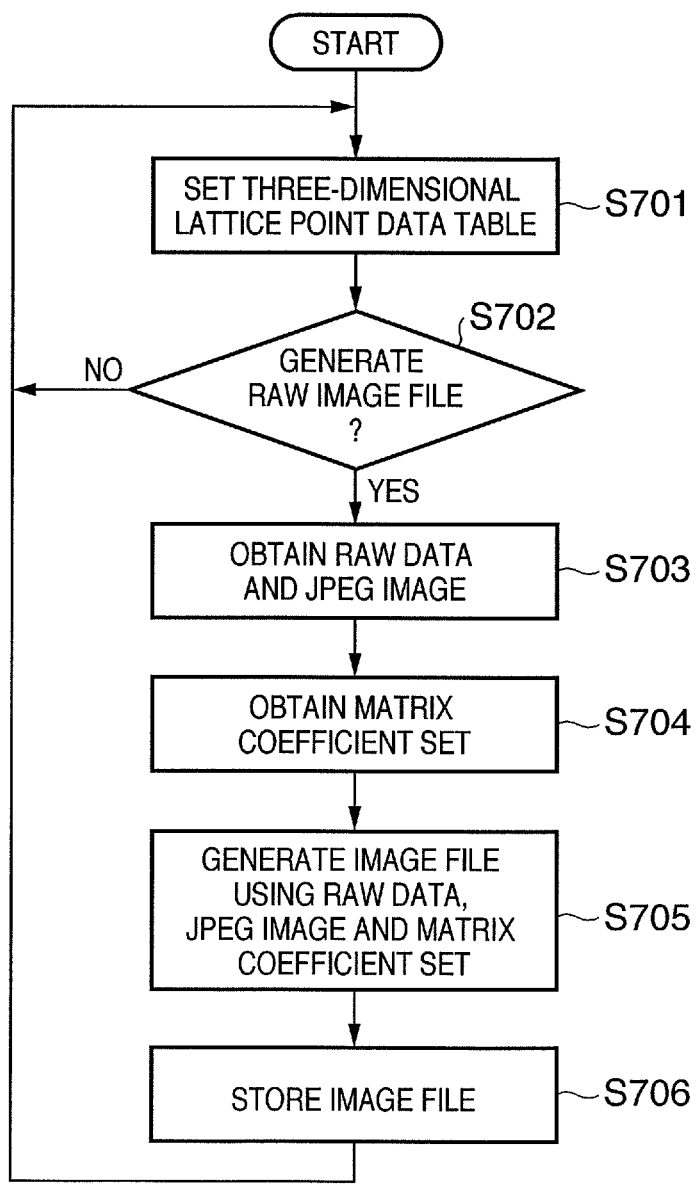
FIG. 11 is a flowchart showing the raw image file generation processing according to the second embodiment.

Accordingly, the processing by the digital camera (CPU 15) according to the second embodiment is as shown in FIGS. 10 and 11. Note that a data setting unit 61 and an image file generator 62 in FIG. 10 are functions realized by executing a control program by the CPU 15. First, at step S701, the data setting unit 61 obtains three-dimensional lattice point data to be used from the memory 9, and sets the data in the three-dimensional lattice point data table 7e. When plural three-dimensional lattice point data exist, as in the case of the first embodiment, three-dimensional lattice point data to be used is selected in correspondence with, e.g., an image-captured scene selected by the user. The three-dimensional lattice point data is held in the memory 9 as shown in FIG. 10. In the memory 9, the three-dimensional lattice point data and the matrix coefficient sets are respectively linked with each other.

When an image file using data obtained by lossless-compressing raw data is generated, the process proceeds from step S702 to step S703. At step S703, an image file generator 62 obtains the lossless-compressed raw data and the JPEG-compressed image data from the memory 9. As described above, the lossless-compressed raw data and the JPEG-compressed image data are generated by the image processing IC 7 and stored in the memory 9. At step S704, the image file generator 62 obtains a matrix coefficient set corresponding to the three-dimensional lattice point data table 7e used in the JPEG compression from the memory 9. Then at step S705, the image file generator 62 generates an image file using the lossless-compressed raw data, the JPEG-compressed image data, and the matrix coefficient set obtained at step S704. Then at step S706, the generated image file is recorded in the external memory 14. Note that, as in the case of the first embodiment, when there are plural matrix coefficient sets in the memory 9, all the matrix coefficient sets may be attached to the raw image file, or it may be arranged such that only the matrix coefficient set used in the generation of the lattice point data of the three-dimensional lattice data table 7e is attached.

When a new raw image file is generated, the above steps S702 to S706 are repeated. Note that when the three-dimensional lattice point data table is changed due to change of image-captured scene or the like, the processing from step S701 is performed, and the three-dimensional lattice point data table is set using new three-dimensional lattice point data.

As described above, according to the second embodiment, an image signal is subjected to image processing by the image processor 7b, and three-dimensional lattice point data to be set in the three-dimensional lattice point data table 7e is obtained from the memory 9. Since it is unnecessary to calculate the three-dimensional lattice point data from a matrix coefficient set as in the case of the first embodiment, image storage processing in the camera can be performed at a high speed. On the other hand, as in the case of the first embodiment, a matrix coefficient set is stored in a raw image file. Accordingly, the application software on the information processing apparatus side performs a similar operation to that in the first embodiment.

As described above, according to the second embodiment, even when different image processing methods are used, as a pair of three-dimensional lattice point data and high-order matrix data are used in the respective image processings, images having the same color representation can be obtained.

Note that in the second embodiment, a JPEG image and a matrix coefficient set are attached to a raw image file, further, three-dimensional lattice point data used in the generation of the JPEG image may be recorded in the file. In this case, as the three-dimensional lattice point data is attached to the file, the application can grasp the three-dimensional lattice point data used in the generation of the JPEG image, and can use and reproduce the data.

As described above, according to the first embodiment, necessary lattice point data of three-dimensional lattice point data table can be calculated by performing high-order matrix operation as a basis of the three-dimensional lattice data table. Accordingly, in a digital camera having a three-dimensional lattice point data table, it is unnecessary to directly hold the lattice point data used in the three-dimensional lattice point data table. Further, when data converted using the three-dimensional lattice point data table stands among lattice points, as calculation can be made from peripheral lattice points including the input data, the interval between lattice points can be rough. Accordingly, the amount of data stored inside the camera can be minimized. Further, according to the second embodiment, as three-dimensional lattice point data utilized inside the camera and a matrix coefficient set to be attached to a raw image file are held, it is unnecessary to calculate the three-dimensional lattice point data inside the camera. Further, the matrix coefficient set utilized by the application and the three-dimensional lattice point data table utilized inside the camera can be adapted to the respective image processings by the application and the camera. Accordingly, images having the same color representation can be obtained by both image processings.

Further, as the matrix coefficients include data depending on the individual camera or camera model such as bias error in sensor output and color filter characteristic. Accordingly, the characteristics of individual camera or camera model are absorbed in the matrix coefficients, the user can perform appropriate color representation merely by selecting a preferred image-captured scene without consideration of such characteristics of individual camera or camera model. In the application software, the same image as that obtained by image sensing a predetermined chart can be obtained.

Note that the data of the three-dimensional lattice point data table may be L*, a*, b* or X, Y, Z as well as Red, Green, Blue or Y, U, V. Further, the three-dimensional lattice point data table 7e is positioned in the last of the calculation processing for color-representation, however, the three-dimensional lattice point data table as described above may be used in other conversion processing. Further, an image file is delivered from the digital camera to the information processing apparatus via the external memory, however, the image file may be transferred using communication such as USB. Further, the information processing apparatus may be a printer. Further, in the above respective embodiments, the application of the present invention to the three-dimensional lattice point data table (three-dimensional look-up table) has been described, however, the dimension of the lattice point data table is not limited to the three dimension. For example, the present invention is apparently applicable to a four or more dimensional lattice point data table, or two-dimensional or one-dimensional lattice point data table (two-dimensional look-up table or one-dimensional look-up table).

The embodiments have been described in detail as above, however, the present invention can be implemented as a system, an apparatus, a method, a program or a storage medium. More particularly, the present invention can be applied to a system constituted by a plurality of devices or to an apparatus comprising a single device.

Note that the present invention can be implemented by supplying a software program directly or indirectly to a system or apparatus, reading the supplied program code with a computer of the system or apparatus, and then executing the program code, thereby the functions of the foregoing embodiments are implemented. In this case, the supplied program corresponds to the flowcharts in the figure described in the embodiments.

Accordingly, since the functions of the present invention are implemented by the computer, the program code installed in the computer also implements the present invention. In other words, the claims of the present invention also cover a computer program for the purpose of implementing the functions of the present invention.

In this case, as long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an OS or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, in an image capturing apparatus which performs image processing using a lattice point data table, the memory capacity necessary for storage of the lattice point data table can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-236734, filed on Aug. 17, 2005, which is hereby incorporated by reference herein in its entirety.

What is claimed is:

1. An image capturing apparatus for performing digital processing on an image obtained by image capturing, the apparatus comprising:
   a storing unit configured to store, in advance of obtaining the image by image capturing, (a) a plurality of lattice point data sets for being set in a lattice point data table to perform conversion processing inside the apparatus and (b) a plurality of matrix coefficient sets as bases for a plurality of lattice point data sets for performing conversion processing with a matrix operation outside the apparatus, wherein each of the matrix coefficient sets is a basis for generating a lattice point data set in which a number of lattice points per one dimension is larger than a number of lattice points per one dimension in each of the stored plurality of lattice point data sets;
   a selection unit configured to select a lattice point data set from the plurality of lattice point data sets stored in said storing unit;
   a conversion unit configured to perform conversion processing on image data using the lattice point data set selected by said selection unit; and
   a file generation unit configured to generate an image file which includes (a) the image data, and (b) a matrix coefficient set stored in said storing unit, as attendant information in the image file,
   wherein the matrix coefficient set included in the image file corresponds to the lattice point data set which is selected by said selection unit and is configured to generate the lattice point data set by a matrix operation.

2. The apparatus according to claim 1, wherein said selection unit selects the lattice point data set in accordance with an image-captured scene.

3. The apparatus according to claim 1, wherein the image file includes raw image data as the image data in the image file.

4. The apparatus according to claim 3, wherein the image file includes compressed image data in the image file.

5. The apparatus according to claim 1, wherein the lattice point data table is a three-dimensional lattice point data table.

6. The apparatus according to claim 1, wherein said conversion unit performs interpolation of a data point within lattice points of the lattice point data set.

7. The apparatus according to claim 1, wherein the matrix coefficient sets are for calculating values of respective lattice points of the lattice point data table without performing a matrix definition processing.

8. An image processing method for an image capturing apparatus for performing digital processing on an image obtained by image capturing, the method comprising:
   a selection step of selecting a lattice point data set stored in a storing unit that stores, in advance of obtaining the image by image capturing, (a) a plurality of lattice point data sets for being set in a lattice point data table to perform conversion processing inside the apparatus and (b) a plurality of matrix coefficient sets as bases for a plurality of lattice point data sets for performing conversion processing with a matrix operation outside the apparatus, wherein each of the matrix coefficient sets is a basis for generating a lattice point data set in which a number of lattice points per one dimension is larger than a number of lattice points per one dimension in each of the stored plurality of lattice point data sets;
   a conversion step of performing conversion processing on image data using the lattice point data set selected in said selection step; and
   a file generation step of generating an image file which includes (a) the image data, and (b) a matrix coefficient set stored in the storing unit, as attendant information in the image file,
   wherein the matrix coefficient set included in the image file corresponds to the lattice point data set which is selected in said selection step and is configured to generate the lattice point data set by a matrix operation.

9. A non-transitory computer-readable memory storing a control program for executing the image processing method of claim 8 by a computer.

10. The apparatus according to claim 1, wherein the lattice point data table is a three-dimensional lattice point data table, and
   wherein the matrix coefficient set included in the image file is used by the apparatus to generate the lattice point data set which is selected by said selection unit and included in the image file.

11. The apparatus according to claim 10, wherein the image data included in the image file comprises lossless-compressed image data, and
   wherein the image file further includes JPEG image data as attendant information.

12. The apparatus according to claim 10, wherein the plurality of matrix coefficient sets stored in said storing unit are included in the image file as attendant information.

13. The apparatus according to claim 1, wherein each of the plurality of matrix coefficient sets is a set of coefficients of terms in an expansion equation for a matrix operation of a predetermined order of 2 or more.

14. The apparatus according to claim 1, wherein the lattice point data table stored by said storing unit indicates a relationship between image signals before and after conversion in a color conversion processing.

* * * * *